US008280122B2

(12) United States Patent
Iizuka et al.

(10) Patent No.: US 8,280,122 B2
(45) Date of Patent: Oct. 2, 2012

(54) REGISTRATION DEVICE, COLLATION DEVICE, EXTRACTION METHOD, AND PROGRAM

(75) Inventors: Ken Iizuka, Kanagawa (JP); Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1097 days.

(21) Appl. No.: 11/746,726

(22) Filed: May 10, 2007

(65) Prior Publication Data

US 2008/0181466 A1 Jul. 31, 2008

(30) Foreign Application Priority Data

May 17, 2006 (JP) ................................. 2006-137824
Sep. 21, 2006 (JP) ................................. 2006-256498

(51) Int. Cl.
*G06K 9/00* (2006.01)
*G06K 9/62* (2006.01)
*G06K 9/40* (2006.01)

(52) U.S. Cl. ........ 382/124; 382/209; 382/210; 382/260; 340/5.52; 340/5.82

(58) Field of Classification Search .................. 382/100, 382/115, 124, 125, 260, 261, 263, 209, 210; 340/5.52–5.54, 5.82–5.84
See application file for complete search history.

(56) References Cited

U.S. PATENT DOCUMENTS

| | | | | |
|---|---|---|---|---|
| 4,577,345 A * | 3/1986 | Abramov | ....................... | 382/124 |
| 4,699,149 A * | 10/1987 | Rice | ............................... | 600/475 |
| 4,743,107 A * | 5/1988 | Aizu et al. | ..................... | 351/221 |
| 5,177,802 A * | 1/1993 | Fujimoto et al. | .............. | 382/124 |
| 5,276,498 A * | 1/1994 | Galbraith et al. | ........... | 356/237.2 |
| 5,608,824 A * | 3/1997 | Shimizu et al. | ................ | 382/276 |
| 5,751,844 A * | 5/1998 | Bolin et al. | ..................... | 382/156 |
| 5,926,555 A * | 7/1999 | Ort et al. | ........................ | 382/124 |
| 6,522,773 B1 * | 2/2003 | Houdeau | ........................ | 382/124 |
| 6,650,443 B1 * | 11/2003 | Izumi | ............................. | 358/475 |
| 6,753,989 B2 * | 6/2004 | Holmes et al. | .................... | 359/2 |
| 6,853,444 B2 * | 2/2005 | Haddad | ............................. | 356/71 |
| 7,254,255 B2 * | 8/2007 | Dennis | ............................ | 382/115 |
| 7,362,884 B2 * | 4/2008 | Willis et al. | .................... | 382/116 |

(Continued)

FOREIGN PATENT DOCUMENTS

EP 1811452 A1 * 10/2005

(Continued)

OTHER PUBLICATIONS

WO 2006/049191 A1 Sato, Hideo (Japanese document) "Information Processing System and Information Processing Device" May 11, 2006. English translation (US PG Pub 2008/191839) Sato.*

(Continued)

*Primary Examiner* — Chan S Park
*Assistant Examiner* — Mia M Thomas
(74) *Attorney, Agent, or Firm* — SNR Denton US LLP

(57) ABSTRACT

The present invention provides a registration device which can improve the authentication accuracy. The registration device includes a detection means for detecting fluctuation information that fluctuates according to an illumination intensity in an image-pickup element, a filter means for performing the spatial filter processing for an image signal output from the image-pickup element using a filter coefficient which is made to correspond to the fluctuation information detected by the detection means, and extracting a living organism identification subject contained in the image signal, and a registration means for generating registration data from the image signal that is spatially filtered by the filter means, and storing thus generated registration data in a storage medium.

14 Claims, 13 Drawing Sheets

U.S. PATENT DOCUMENTS

| | | | | |
|---|---|---|---|---|
| 7,366,331 B2* | 4/2008 | Higuchi | | 382/124 |
| 7,526,333 B2* | 4/2009 | Yasushi et al. | | 600/519 |
| 7,643,143 B2* | 1/2010 | Fujii et al. | | 356/336 |
| 7,692,774 B2* | 4/2010 | Sato | | 356/71 |
| 7,945,077 B2* | 5/2011 | Demos | | 382/128 |
| 2001/0026632 A1 | 10/2001 | Tamai | | 382/116 |
| 2002/0048014 A1* | 4/2002 | Kono et al. | | 356/71 |
| 2002/0057826 A1* | 5/2002 | Imamura et al. | | 382/128 |
| 2003/0063783 A1* | 4/2003 | Higuchi | | 382/125 |
| 2003/0191399 A1* | 10/2003 | Muramatsu et al. | | 600/480 |
| 2004/0001639 A1* | 1/2004 | Ohno | | 382/254 |
| 2004/0041998 A1* | 3/2004 | Haddad | | 356/71 |
| 2004/0071322 A1* | 4/2004 | Choshi et al. | | 382/115 |
| 2004/0218790 A1* | 11/2004 | Ping Lo | | 382/124 |
| 2005/0047632 A1* | 3/2005 | Miura et al. | | 382/124 |
| 2005/0116810 A1* | 6/2005 | Beenau et al. | | 340/5.52 |
| 2005/0184952 A1* | 8/2005 | Konno et al. | | 345/102 |
| 2006/0050966 A1* | 3/2006 | Nishimura et al. | | 382/209 |
| 2006/0142663 A1* | 6/2006 | Sawanoi et al. | | 600/490 |
| 2006/0210119 A1* | 9/2006 | Willis et al. | | 382/115 |
| 2007/0003112 A1* | 1/2007 | Awatsu et al. | | 382/115 |
| 2007/0035718 A1* | 2/2007 | Haddad | | 356/71 |
| 2007/0093948 A1* | 4/2007 | Sago | | 701/29 |
| 2007/0126730 A1* | 6/2007 | Goto et al. | | 345/418 |
| 2007/0160279 A1* | 7/2007 | Demos | | 382/133 |
| 2007/0177774 A1* | 8/2007 | Kuo | | 382/115 |
| 2007/0177807 A1* | 8/2007 | Enomoto | | 382/224 |
| 2007/0222407 A1* | 9/2007 | Sakamoto et al. | | 318/611 |
| 2007/0223791 A1* | 9/2007 | Shinzaki | | 382/124 |
| 2007/0286469 A1* | 12/2007 | Yamagata et al. | | 382/131 |
| 2008/0181466 A1* | 7/2008 | Iizuka et al. | | 382/115 |
| 2008/0191839 A1* | 8/2008 | Sato | | 340/5.82 |
| 2008/0306383 A1* | 12/2008 | Kono et al. | | 600/438 |
| 2009/0060312 A1* | 3/2009 | Kitamura | | 382/132 |
| 2009/0203976 A1* | 8/2009 | Ohnishi et al. | | 600/322 |
| 2010/0045428 A1* | 2/2010 | Miura et al. | | 340/5.53 |
| 2010/0045432 A1* | 2/2010 | Abe | | 340/5.83 |
| 2010/0053066 A1* | 3/2010 | Nonaka et al. | | 345/102 |
| 2010/0134605 A1* | 6/2010 | Demos et al. | | 348/65 |
| 2011/0211057 A1* | 9/2011 | Iwase et al. | | 348/78 |

FOREIGN PATENT DOCUMENTS

| | | | |
|---|---|---|---|
| EP | 1612718 | | 1/2006 |
| JP | 2001-037745 | | 2/2001 |
| JP | 2002-163655 | | 6/2002 |
| JP | 2003-204486 | | 7/2003 |
| JP | 2003-234902 | | 8/2003 |
| JP | 2004-131927 | | 4/2004 |
| JP | 2004-265269 | | 9/2004 |
| JP | 2005-071317 | | 3/2005 |
| JP | 2005-099907 | | 4/2005 |
| JP | 2005-312749 | | 11/2005 |
| WO | 00/39744 | | 7/2000 |
| WO | WO 2006/049191 | * | 5/2006 |

OTHER PUBLICATIONS

Wirth et al. "Contrast enhancement of microcalcifications in mammograms using morphological enhancement and non-flat structuring elements" IEEE 17th Symposium on Computer Based Medical Systems (2004) pp. 1-6.*

European Search Report corresponding to European Serial No. 07009088.1 dated Mar. 25, 2010.

Japanese Office Action issued on Apr. 11, 2008.

European Search Report in counterpart EP Application No. 07009088.1-2218 dated Oct. 18, 2007.

* cited by examiner

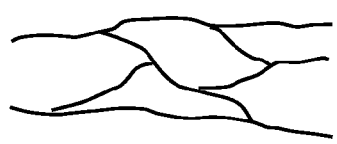
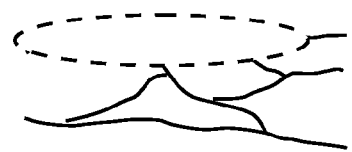
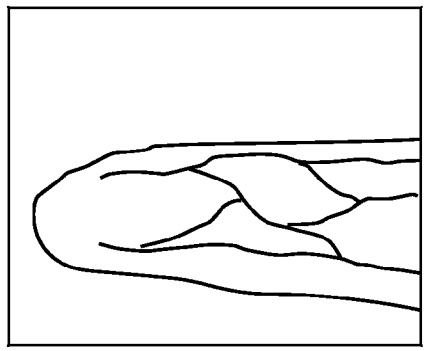
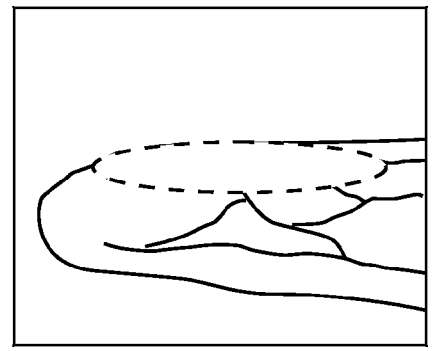

MASK PATTERN APPLICATION

REGISTRATION DEVICE, COLLATION DEVICE, EXTRACTION METHOD, AND PROGRAM

CROSS REFERENCES TO RELATED APPLICATIONS

The present invention contains subject matter related to Japanese Patent Application JP 2006-137824 and JP 2006-256498 filed in the Japanese Patent Office on May 17, 2006 and Sep. 21, 2006 respectively, the entire contents of which being incorporated herein by reference.

BACKGROUND OF THE INVENTION

1. Field of the Invention

The present invention relates to a registration device, a collation device, an extraction method, and a program, which are desirably employed in the biometrics authentication.

2. Description of Related Art

In performing the biometrics authentication, there are used blood vessels as a subject to be authenticated. In general, in an authentication device, for example, a finger is so fixed on an image-pickup camera as to be parallel with the image-pickup surface of the image-pickup camera, and an image of blood vessels of thus fixed finger is picked up. Then, the authentication device registers the image of blood vessels which is obtained as the result of the image-pickup operation in a memory etc. as information to identify a living organism corresponding to the image of blood vessels, or compares the image of blood vessels with a registered image of blood vessels to judge whether or not a living organism corresponding to the image of blood vessels is the identical registrant.

In picking up an image of blood vessels, there are employed two types of configuration, or a type of configuration in which a unit for cutting off outside light is arranged (refer to Jpn. Pat. Appln. Laid-Open Publication No. 2004-131927 [Patent Document 1] and Jpn. Pat. Appln. Laid-Open Publication No. 2005-71317 [Patent Document 2]), and a type of configuration in which a unit for cutting off outside light is omitted (refer to Jpn. Pat. Appln. Laid-Open Publication No. 2005-312749 [Patent Document 3] and Jpn. Pat. Appln. Laid-Open Publication No. 2004-265269 [Patent Document 4]).

In general, in case of picking up an image of blood vessels, a configuration in which a unit for cutting off outside light is arranged is prone to be enlarged in size. Accordingly, in order to meet the demand for miniaturization in recent years, there are suggested many configurations in which a unit for cutting off outside light is omitted.

SUMMARY OF THE INVENTION

On the other hand, in case of employing a configuration in which a unit for cutting off outside light is omitted, according to the image-pickup environment and image-pickup condition, the illumination intensity with respect to an image-pickup subject or a finger whose image is to be picked up may not be roughly uniform.

In this case, according to the image-pickup environment and image-pickup condition, there is raised a difference in illumination intensity with respect to the image-pickup subject between at the time of registration and at the time of image-pickup, and there may be assumed a case in which the difference has an influence on the result of blood vessel extraction processing even if the image-pickup subject at the time of registration and the image-pickup subject at the time of image-pickup are identical, which degrades the authentication accuracy.

It is therefore desirable to overcome the above-mentioned drawbacks by providing a registration device, a collation device, an extraction method, and a program which can improve the authentication accuracy.

According to an embodiment of the present invention, there is provided a registration device, including: a detection means for detecting fluctuation information that fluctuates according to an illumination intensity in an image-pickup element; a filter means for performing a spatial filter processing for an image signal output from the image-pickup element using a filter coefficient which is made to correspond to the fluctuation information detected by the detection means, and extracting a living organism identification subject contained in the image signal; and a registration means for generating registration data from the image signal that is spatially filtered by the filter means, and storing thus generated registration data in a storage medium.

Accordingly, by the spatial filter processing according to the outside light (that is, illumination intensity of light going into image-pickup element) with respect to the registration device, the registration device can make the nonuniformity of image raised by the outside light fluctuation due to the image-pickup environment and image-pickup condition inconspicuous. Accordingly, the registration device can register the living organism identification subject contained in the image signal as registration information without widely changing it according to the outside light fluctuation.

According to an embodiment of the present invention, there is also provided a collation device, including: a detection means for detecting fluctuation information that fluctuates according to an illumination intensity in an image-pickup element; a filter means for performing a spatial filter processing for an image signal output from the image-pickup element using a filter coefficient which is made to correspond to the fluctuation information detected by the detection means, and extracting a living organism identification subject contained in the image signal; and a collation means for collating the image signal that is spatially filtered by the filter means with registered data.

Accordingly, by the spatial filter processing according to the outside light (that is, illumination intensity of light going into image-pickup element) with respect to the collation device, the collation device can make the nonuniformity of image raised by the outside light fluctuation due to the image-pickup environment and image-pickup condition inconspicuous. Accordingly, the collation device can collate the living organism identification subject contained in the image signal with registered living organism identification subject without widely changing it according to the outside light fluctuation.

According to an embodiment of the present invention, there is also provided an extraction method, including: a first step of detecting fluctuation information that fluctuates according to an illumination intensity in an image-pickup element; a second step of performing a spatial filter processing for an image signal output from the image-pickup element using a filter coefficient which is made to correspond to the fluctuation information detected in the first step, and extracting a living organism identification subject contained in the image signal; and a third step of generating registration data or data to be collated with the registration data from the image signal that is spatially filtered.

Accordingly, by the spatial filter processing according to the illumination intensity of light going into the image-pickup element, the extraction method can make the nonuniformity of image raised by the outside light fluctuation due to the image-pickup environment and image-pickup condition inconspicuous. Accordingly, the extraction method can generate the living organism identification subject contained in the image signal as registration information or information to be collated with registration information without widely changing it according to the outside light fluctuation.

According to an embodiment of the present invention, there is also provided a program that makes a computer execute the steps of: detecting fluctuation information that fluctuates according to an illumination intensity in an image-pickup element; performing a spatial filter processing for an image signal output from the image-pickup element using a filter coefficient which is made to correspond to the detected fluctuation information, and extracting a living organism identification subject contained in the image signal; and generating registration data or data to be collated with the registration data from the image signal that is spatially filtered.

Accordingly, by the spatial filter processing according to the illumination intensity of light going into the image-pickup element, the program can make the nonuniformity of image raised by the outside light fluctuation due to the image-pickup environment and image-pickup condition inconspicuous. Accordingly, the program can generate the living organism identification subject contained in the image signal as registration information or information to be collated with registration information without widely changing it according to the outside light fluctuation.

According to the present invention, the living organism identification subject contained in the image signal can be generated as registration information or information to be collated with registration information without widely changing it according to the outside light fluctuation. Accordingly, it can be prevented that the living organism identification subject contained in an image signal is different even if the identical image-pickup subject is picked up, which can realize the registration device, collation device, extraction method, and program which are capable of improving the authentication accuracy.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIG. 2A to FIG. 2D show schematic views indicative of the difference of the amount of blood vessels raised due to the local difference of the illumination intensity with respect to an image-pickup subject;

DETAILED DESCRIPTION OF THE PREFERRED EMBODIMENTS

Referring to the accompanying drawings, embodiments of the present invention will be described below.

Figure 1:
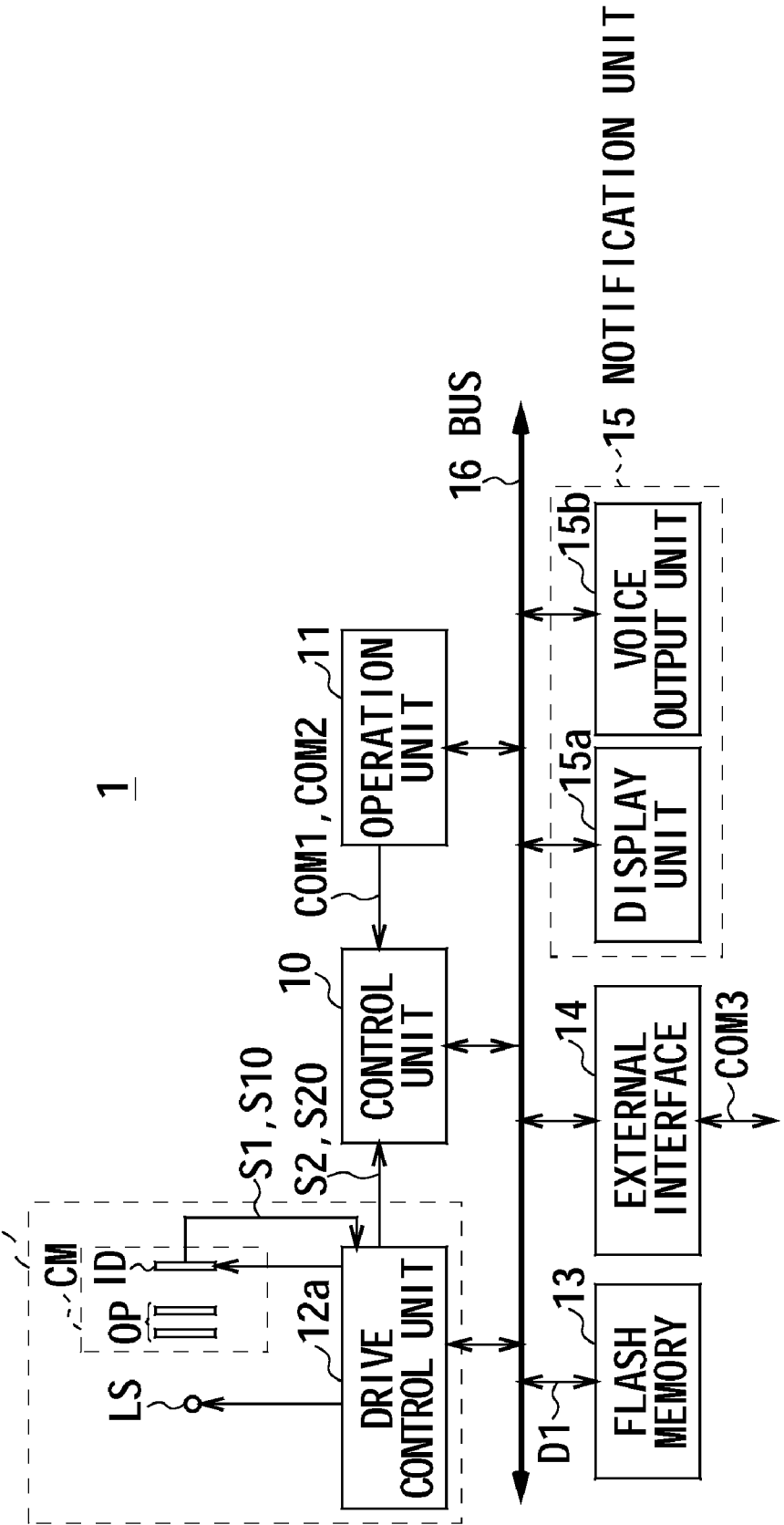
FIG. 1 shows a block diagram indicative of the entire configuration of an authentication device according to an embodiment of the present invention.

(1) Entire Configuration of an Authentication Device According to an Embodiment of the Present Invention FIG. 1 shows a block diagram indicative of the entire configuration of an authentication device 1 according to an embodiment of the present invention. The authentication device 1 includes a control unit 10, and further includes an operation unit 11, a blood vessel image-pickup unit 12, a flash memory 13, an interface (referred to as external interface, hereinafter) 14 that transmits and receives data to and from external devices, and a notification unit 15, which are connected to the control unit 10 through a bus 16.

The control unit 10 is a computer that includes a Central Processing Unit (CPU) that controls the entire authentication device 1, a Read Only Memory (ROM) that has stored therein various programs and setup information, and a Random Access Memory (RAM) as a work memory for the CPU.

To the control unit 10, an execution command COM 1 for executing a mode (referred to as blood vessel registration mode, hereinafter) of registering blood vessels of a user (referred to as registrant, hereinafter) to be registered, or an execution command COM 2 for executing a mode (referred to as authentication mode, hereinafter) of judging the existence of the identical registrant is given from the operation unit 11 according to the operation of the user.

The control unit 10 determines a mode to be executed based on the execution command COM 1 and execution command COM 2, and executes the blood vessel registration mode or the authentication mode by arbitrarily controlling the blood vessel image-pickup unit 12, flash memory 13, external interface 14, and notification unit 15 based on a program corresponding to the result of mode determination.

(1-1) Blood Vessel Registration Mode

Specifically, in case of determining the blood vessel registration mode as a mode to be executed, the control unit 10 changes the operation mode to the blood vessel registration mode, and controls the blood vessel image-pickup unit 12.

In this case, a drive control unit 12a of the blood vessel image-pickup unit 12 drives and controls one or more near infrared ray light sources LS for irradiating a near infrared ray to a finger placed at a predetermined position of the authentication device 1, and an image-pickup element ID being a Charged Coupled Device (CCD) of an image-pickup camera CM.

As a result, in the blood vessel image-pickup unit 12, a near infrared ray irradiated to the finger passes through the inside of the finger to be reflected and scattered therein, and goes into the image-pickup element ID through an optical system OP and a diaphragm DH as light (referred to as blood vessel projection light, hereinafter) that projects blood vessels of the finger. The image-pickup element ID carries out the photo-electric conversion for the blood vessel projection light, and outputs the resulting signal obtained by the photoelectric conversion to the drive control unit 12a as an image signal S1.

On the other hand, actually, part of the near infrared ray irradiated to the finger is reflected by the surface of the finger to go into the image-pickup element ID. Accordingly, the image of the image signal S1 output from the image-pickup element ID contains not only the blood vessels located at the inside of the finger but also the outline and fingerprint of the finger.

The drive control unit 12a adjusts the lens position of an optical lens arranged in the optical system OP based on the pixel value of the image such that the optical lens is brought to a focus on the blood vessels located at the inside of the finger, and adjusts the exposure time for the image-pickup element ID such that the amount of light going into the image-pickup element ID becomes suitable, and supplies an image signal S2 that is output from the image-pickup element ID after the adjustment to the control unit 10.

The control unit 10 performs predetermined image processing for the image signal S2, and registers an image that has the blood vessel forming pattern (referred to as blood vessel pattern, hereinafter) extracted by the image processing as information (referred to as registrant identification data, hereinafter) D1 to identify a registrant by storing the image in the flash memory 13.

In this way, the control unit 10 can execute the blood vessel registration mode.

(1-2) Authentication Mode

On the other hand, in case of determining the authentication mode as a mode to be executed, the control unit 10 changes the operation mode to the authentication mode, and controls the blood vessel image-pickup unit 12 similar to the case of the above-described blood vessel registration mode.

In this case, the blood vessel image-pickup unit 12 drives and controls the near infrared ray light sources LS and image-pickup element ID, and adjusts the lens position of an optical lens arranged in the optical system OP and the exposure time for the image-pickup element ID based on an image signal S10 output from the image-pickup element ID, and supplies an image signal S20 that is output from the image-pickup element ID after the adjustment to the control unit 10.

The control unit 10 performs the same image processing as that in the blood vessel registration mode for the image signal S20, and reads out the registrant identification data D1 registered in the flash memory 13. Then, the control unit 10 collates the blood vessel pattern extracted by the image processing with the blood vessel pattern of the registrant identification data D1, and judges whether or not the user who places the finger on the authentication device is a registrant (qualified user) according to the degree of coincidence.

In case of determining that the user is a registrant, the control unit 10 generates an execution command COM 3 for making a performance processing device, not shown, connected to the external interface 14 carry out a predetermined performance, and transfers the execution command COM 3 to the performance processing device through the external interface 14.

As an embodiment of the performance processing device connected to the external interface 14, for example, in case a door in the locked state is employed, the control unit 10 transfers an execution command COM 3 to carry out the unlocking performance to the door. Furthermore, as an embodiment of another performance processing device, for example, in case a computer that has its part of performance modes among a plurality of performance modes restricted is employed, the control unit 10 transfers an execution command COM 3 to unrestrict the restricted performance modes to the computer.

As the embodiment, there are cited two examples, to which the embodiment is not restricted, and other embodiments may be arbitrarily selected. In this embodiment, the performance processing device is connected to the external interface 14. On the other hand, the software and hardware configurations of the performance processing device may be loaded in the authentication device 1.

On the other hand, in case of determining that the user is not a registrant, the control unit 10 displays this determination result on a display unit 15a of the notification unit 15, and also outputs a voice through a voice output unit 15b of the notification unit 15, thereby notifying visually as well as auditorily that the user is not a registrant.

In this way, the control unit 10 can execute the authentication mode.

(2) Relationship Between Configuration of Image-Pickup Unit and Authentication Accuracy In the blood vessel image-pickup unit 12 in this embodiment, due to the demand for miniaturization, reduction of the number of parts, etc., a configuration in which a unit for cutting off outside light such as visible light coming to a finger placed on the housing surface of the authentication device 1 is omitted is employed.

In a configuration in which a unit for cutting off outside light is omitted, according to the image-pickup environment and image-pickup condition, since the illumination intensity with respect to a finger placed on the housing surface of the authentication device 1 may be enlarged in some regions, the amount of light with respect to the image-pickup surface of the image-pickup element ID may not be roughly uniform in many cases.

In this case, according to the image-pickup environment and image-pickup condition, even if the identical image-pickup subject is picked up, there is raised a difference between an image picked up at the time of registration and an image picked up at the time of image-pickup, and there may be assumed a case in which the blood vessel forming pattern is changed due to the difference.

For example, as shown in FIG. 2A to FIG. 2D, it is assumed that, at the time of registration, blood vessels (FIG. 2B) extracted from an image (FIG. 2A) which is picked up under the state in which the amount of light with respect to the image-pickup surface of the image-pickup element ID is substantially uniform are registered, while at the time of authentication, an image is picked up under the state in which the amount of light with respect to part of the image-pickup surface is extremely enlarged as compared with the amount of light with respect to the other part thereof.

In this case, the corresponding part in the image at the time of authentication comes to be blank (FIG. 2C), and blood vessels (FIG. 2D) extracted from the image differ from the blood vessels (FIG. 2B) for registration. As a result, in this case, there is brought about a result in which, even if the user is the identical registrant, it is determined that the user is the third party. In FIG. 2A to FIG. 2D, for the sake of convenience, the blood vessels in the picked up images (FIG. 2A and FIG. 2C) and the blood vessels extracted from these images (FIG. 2B and FIG. 2D) are made completely identical.

In this way, due to the local difference of the amount of light (referred to as outside light illumination intensity, hereinafter) with respect to the image-pickup surface of the image-pickup element ID, a False Rejection Rate (FRR) and a False Acceptance Rate (FAR) are undesirably raised, which degrades the authentication accuracy.

(3-A) Processing Contents of Control Unit in First Embodiment

In the control unit 10 of the authentication device 1, an image processing and a collation processing to reduce the noise component which is raised due to the outside light illumination intensity are employed as the processing in the first embodiment.

(3-A-1) Functional Configuration

Figure 3:
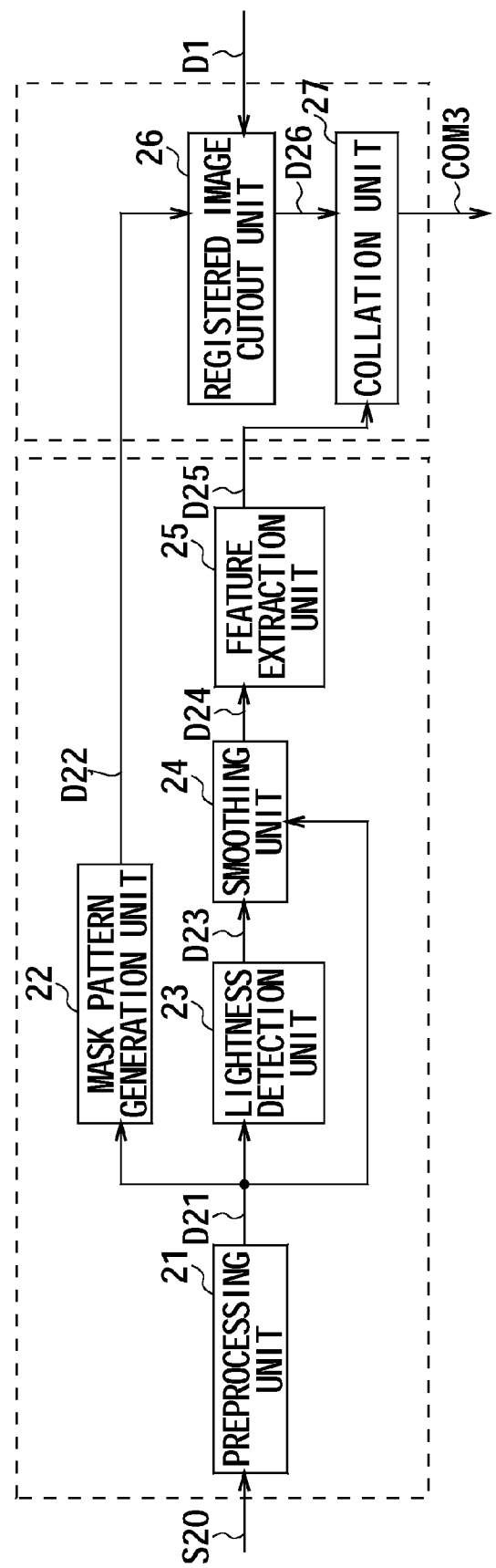
FIG. 3 shows a block diagram indicative of the functional configuration of image processing and collation processing of a control unit in the first embodiment.

FIG. 3 shows a block diagram indicative of the functional configuration of the control unit 10 in the first embodiment, which includes a preprocessing unit 21, a mask pattern generation unit 22, a lightness detection unit 23, a smoothing unit 24, a feature extraction unit 25, a registered image cutout unit 26, and a collation unit 27.

In the blood vessel registration mode, an image processing is performed sequentially through the preprocessing unit 21, lightness detection unit 23, smoothing unit 24, and feature extraction unit 25, and the registrant identification data D1 (FIG. 1) which is obtained as the result of the image processing is registered in the flash memory 13 (FIG. 1).

On the other hand, in the authentication mode, after the same image processing (from preprocessing unit 21 to feature extraction unit 25) as that in the blood vessel registration mode is performed, a collation processing is performed sequentially through the registered image cutout unit 26 and collation unit 27, and it is judged whether or not the user is a registrant (qualified user) or the third party as the result of the collation processing.

Hereinafter, the respective units of the control unit 10 in the authentication mode will be explained.

The preprocessing unit 21 takes in an exposure time with respect to the image-pickup element ID, set up in the drive control unit 12a, from the drive control unit 12a, and judges whether or not the exposure time is within a predetermined exposure time range. The exposure time is directly reflected on the amount of light going into the image-pickup element ID, and in case the exposure time is equal to or more than a predetermined threshold value, this means that light necessary at the time of image-pickup is originally not obtained.

Accordingly, in case the value of the exposure time taken in from the drive control unit 12a is equal to or more than a predetermined threshold value, the preprocessing unit 21 suspends the authentication mode and sends a notification that the image-pickup has to be carried out again through the notification unit 15 (FIG. 1).

On the other hand, in case the exposure time is less than a predetermined threshold value, the preprocessing unit 21 performs a Analog/Digital (A/D) conversion processing and a predetermined outline extraction processing such as the Sobel filer processing for the image signal S20 supplied from the blood vessel image-pickup unit 12, and judges whether or not the area of a region enclosed by the finger outline that is extracted by the outline extraction processing is less than a predetermined threshold value.

In case the area of a region enclosed by the finger outline is less than a predetermined threshold value, the preprocessing unit 21 determines that the image is not suitable for a subject to be collated, and suspends the authentication mode and sends a notification that the image-pickup has to be carried out again through the notification unit 15 (FIG. 1). On the other hand, in case the enclosed area is equal to or more than a predetermined threshold value, the preprocessing unit 21 determines that the image is suitable for a subject to be collated, and sends image data D21 to the mask pattern generation unit 22, lightness detection unit 23, and smoothing unit 24, respectively.

Figure 4:
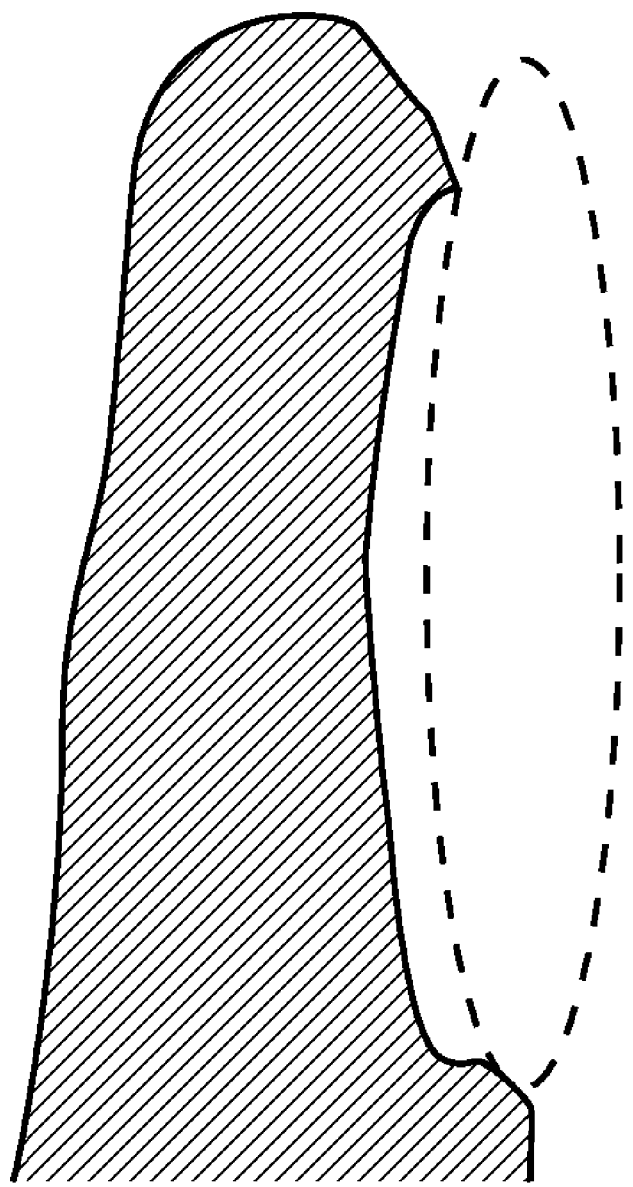
FIG. 4 shows a schematic view to explain the generation of a mask pattern.

The mask pattern generation unit 22 recognizes the finger outline from the image of the image data D21, and generates a pattern image (referred to as mask pattern, hereinafter) that has its region corresponding to the finger outline masked, as shown in FIG. 4, and sends thus generated signal to the registered image cutout unit 26 as mask pattern data D22.

Figure 5:
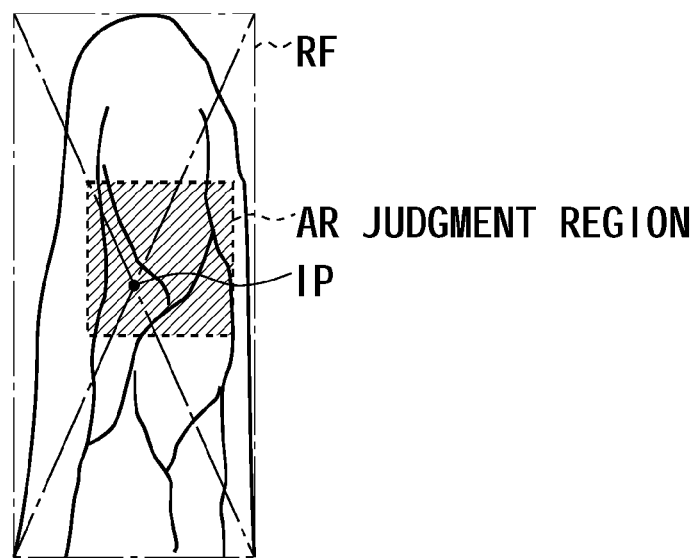
FIG. 5 shows a schematic view to explain the selection of a judgment region.

On the other hand, the lightness detection unit 23 recognizes the finger outline from the image of the image data D21, and selects a judgment region AR within the finger outline, as shown in FIG. 5, and sums up the brightness of pixels in the judgment region AR. Then, the lightness detection unit 23 sends thus obtained total brightness value to the smoothing unit 24 as data (referred to as lightness data, hereinafter) D23.

As the method of selecting the judgment region AR, in case of this embodiment, there is employed a method of sequentially selecting neighboring pixels within the finger outline from the intersection point IP of the diagonal lines of a minimum rectangle frame RF that internally encloses the finger outline up to a predetermined number.

Figure 6:
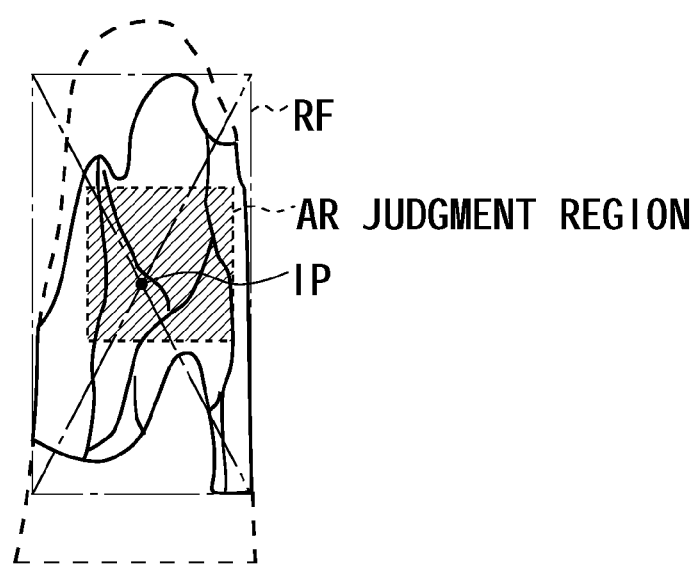
FIG. 6 shows a schematic view of a selection example of the judgment region.

Accordingly, in case a finger out line shown in FIG. 6 is extracted due to the local difference of the outside light illumination intensity, or in case there arises the individual difference in finger diameter, the lightness detection unit 23 in this embodiment can prevent that part of a finger where blood vessels do not exist is reflected on the lightness data D23, which makes it possible to figure out the illumination intensity corresponding to part of a finger where blood vessels densely exist more faithfully.

Before smoothing the image by employing the Gaussian filter processing, the smoothing unit 24 sets up a filter coefficient of the smoothing filter according to the total brightness value of the lightness data D23 and the comparison result with a threshold value which is set up in advance.

Specifically, in case the total brightness value is equal to or more than a threshold value, this means that, in the image of the image data D21 (FIG. 2C), the outside light illumination intensity corresponding to part where the feature of blood vessels should be extracted is large. Accordingly, in this case, the smoothing unit 24 sets up the filter coefficient of the smoothing filter (Gaussian filter) to a filter coefficient that is made to correspond to high brightness.

On the other hand, in case the outside light illumination intensity is less than a threshold value, this means that the outside light illumination intensity corresponding to part where the feature of blood vessels should be extracted is small. Accordingly, in this case, the smoothing unit 24 sets up the filter coefficient of the smoothing filter (Gaussian filter) to a filter coefficient that is made to correspond to low brightness.

In this state, the smoothing unit 24 performs the Gaussian filter processing for the image data D21 supplied from the preprocessing unit 21 using the set up filter coefficient, and sends resulting image data D24 to the feature extraction unit 25.

The feature extraction unit 25 performs the binarization processing and skeletonization processing for the image data D24 supplied from the smoothing unit 24 to extract the feature of blood vessels, and sends resulting blood vessel data to the collation unit 27 as data (referred to as collation subject person feature data, hereinafter) D25 indicative of the feature of a person to be collated.

In this way, the control unit 10 excludes part whose image has not been picked up due to the local difference of the outside light illumination intensity, and with respect to part whose image has been picked up, the degree of smoothing can be switched according to the lightness in the central region of the part.

Figures 7A, 7B:
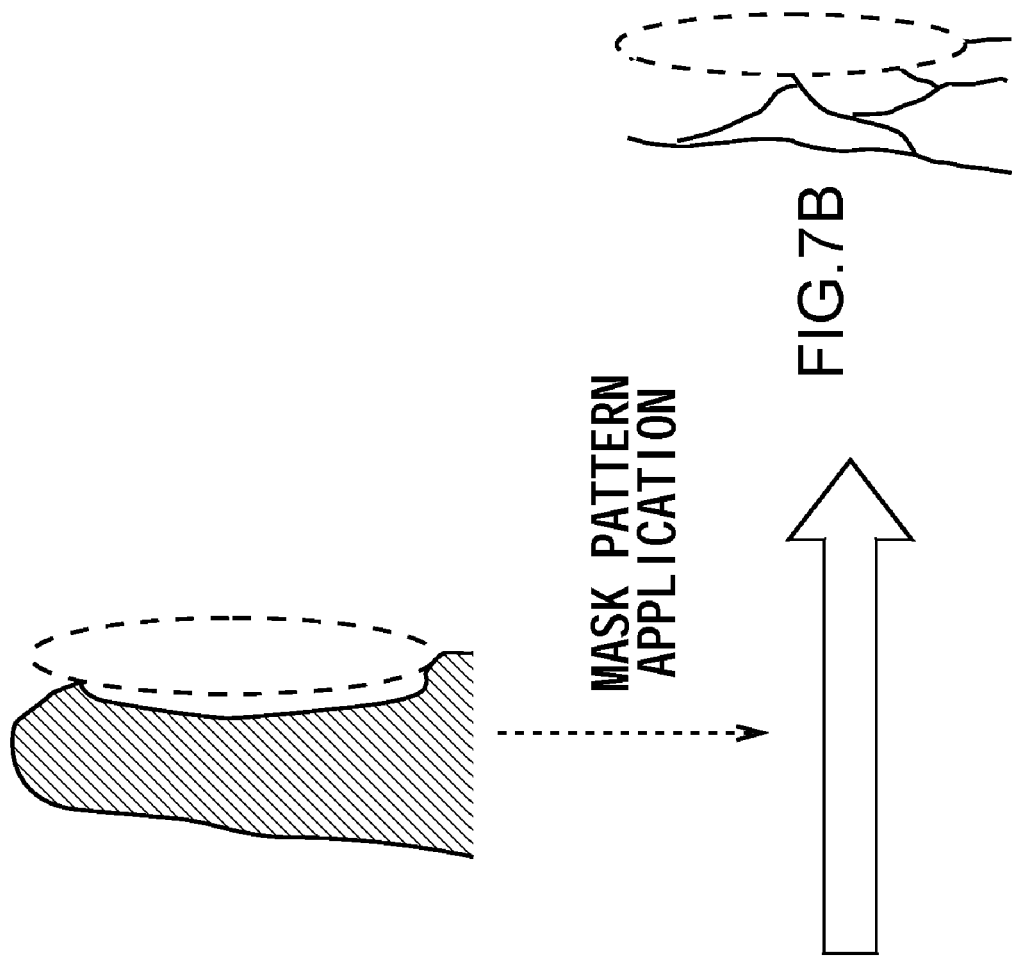
FIG. 7 shows schematic view to explain the processing of cutting out part of registered blood vessels.

The registered image cutout unit 26 reads out the registrant identification data D1 from the flash memory 13 (FIG. 1), and, as shown in FIG. 7, from blood vessels of thus read out registrant identification data D1, cuts out part of blood vessels corresponding to the mask pattern of the mask pattern data D22 supplied from the mask pattern generation unit 22.

Then, the registered image cutout unit 26 sends data of thus cut out part of blood vessels (FIG. 7) to the collation unit 27 as registrant identification data D26.

As a result, the registrant identification data D26 comes to be data of part of the blood vessels of the previously registered registrant identification data D1 (FIG. 7), that is, data of the blood vessels of the registrant identification data D1 that has its part whose image has not been picked up due to the local difference of the outside light illumination intensity excluded, which part is excluded from the subject to be collated.

The collation unit 27 collates the blood vessels of the registrant identification data D26 with the blood vessels of the collation subject person feature data D25, and, in case of determining that the user who places the finger on the authentication device is a registrant (qualified user) as the collation result, sends the execution command COM 3 for making a performance processing device, not shown, carry out a predetermined performance to the external interface 14 (FIG. 1).

In this way, from the previously registered blood vessels, after excluding part whose image has not been picked up due to the local difference of the outside light illumination intensity from the subject to be collated (FIG. 7), the control unit 10 can perform the collation.

(3-A-2) Authentication Processing of Control Unit in First Embodiment

Next, the authentication processing of the control unit 10 in the first embodiment will be explained using a flowchart shown in FIG. 8.

When receiving the execution command COM 2, the control unit 10 starts an authentication processing sequence RT 1 in step SP 0, and then controls the blood vessel image-pickup unit 12 through the drive control unit 12a in subsequent step SP 1.

Then, in step SP 2, the control unit 10 judges whether or not the exposure time with respect to the image-pickup element ID in the blood vessel image-pickup unit 12 is less than a predetermined threshold value as well as the area of a region enclosed by the finger outline of the image signal S20 which is obtained as the image-pickup result in the blood vessel image-pickup unit 12 is equal to or more than a predetermined area.

In case of obtaining the positive result, going to step SP 3, the control unit 10 generates the region enclosed by the finger outline of the image signal S20 as the mask pattern (FIG. 4), and, in subsequent step SP 4, selects the judgment region AR (FIG. 5) within the finger outline from the image of the image signal S20.

Then, going to the step SP 5, the control unit 10 detects the total brightness value of pixels in the judgment region AR, and, in subsequent step SP 6, judges whether or not the total brightness value is equal to or more than a threshold value.

In case the total brightness value is equal to or more than a threshold value, in step SP 7, the control unit 10 sets up a filter coefficient of a value corresponding to high brightness. On the other hand, in case the total brightness value is less than a threshold value, in step SP 8, the control unit 10 sets up a filter coefficient of a value corresponding to low brightness.

Then, in step SP 9, using thus set up filter coefficient, the control unit 10 performs the Gaussian filter processing, and further performs the binarization processing and skeletonization processing for the image data D21 to extract the feature of blood vessels.

Then, in subsequent step SP 10, the control unit 10 reads out the registrant identification data D1 from the flash memory 13 (FIG. 1), and then, in subsequent step SP 11, from blood vessels of the registrant identification data D1 (FIG. 7), cuts out part of blood vessels corresponding to the mask pattern generated in step SP3.

Then, in subsequent step SP12, the control unit 10 collates the feature of part of the blood vessels cut out from the registrant identification data D1 with the feature of the blood vessels extracted in step SP 9, that is, collates the features of the blood vessels of part corresponding to the mask pattern, and, in subsequent step SP 13, judges whether or not the degree of similarity obtained as the collation result is equal to or more than a threshold value.

In case the degree of similarity is equal to or more than a threshold value, in step SP 14, the control unit 10 makes a performance processing device, not shown, execute a predetermined processing through the external interface 14 (FIG. 1), and, going to step SP 15, ends the authentication processing sequence RT 1.

On the other hand, in case the degree of similarity is less than a threshold value, in step SP 16, the control unit 10 sends a notification that the user is not a registrant through the notification unit 15 (FIG. 1), and, going to step SP 15, ends the authentication processing sequence RT 1.

On the other hand, in step SP 2, in case the exposure time with respect to the image-pickup element ID in the blood vessel image-pickup unit 12 is less than a predetermined threshold value as well as the area of a region enclosed by the finger outline of the image signal S20 which is obtained as the image-pickup result in the blood vessel image-pickup unit 12 is equal to or more than a predetermined area, this means that, due to the local difference of the outside light illumination intensity, the region to be collated is extremely lacking as compared with a region which is to be collated originally. Accordingly, in this case, without executing the processings in step SP 3 and subsequent steps, the control unit 10 goes to step SP 15 to end the authentication processing sequence RT 1.

In this way, in accordance with the authentication processing sequence RT 1, the control unit 10 can carry out the authentication mode.

On the other hand, in case of the blood vessel registration mode, when receiving the execution command COM 1, the control unit 10 executes the processings from step SP 1 to step SP 9, and registers the feature of the blood vessels extracted as the processing result in the flash memory 13 (FIG. 1) as the registrant identification data D1 (FIG. 1).

(3-A-3) Performance and Effect

In the above-described configuration, the authentication device 1 detects the brightness of the image signal S2 or the image signal S20 output from the image-pickup element ID as fluctuating information that fluctuates according to the illumination intensity in the image-pickup element ID, and performs the smoothing processing for the image signal S2 or the image signal S20 using a smoothing filter coefficient corresponding to thus detected brightness.

By employing the smoothing processing according to the illumination intensity of light going into the image-pickup element ID, the authentication device 1 can make the nonuniformity in the image signal S2 or the image signal S20 raised by the outside light fluctuation due to the image-pickup environment and image-pickup condition inconspicuous. In other words, in the authentication device 1, the image is corrected (smoothed) such that the surface of the blood vessel depth (depth from finger pad surface) corresponding to the illumination intensity of light going into the image-pickup element ID comes to be the image-pickup surface.

Accordingly, the authentication device 1 can generate a living organism identification subject, which is a living organism to be identified, contained in the image signal S2 or image signal S20 as registration information or information to be collated with registration information without widely changing it according to the outside light fluctuation. As a result, the difference of the outside light fluctuation at the time of registration and at the time of authentication can be absorbed.

Furthermore, before detecting the brightness of the image signal S2 or the image signal S20 output from the image-pickup element ID, the authentication device 1 adjusts the exposure time for the image-pickup element ID (Auto Light Control [ALC]) through the drive control unit 12a, and, in case thus adjusted exposure time comes to be a value representing an outside light illumination intensity equal to or more than a predetermined value, detects the brightness of the image signal S2 or the image signal S20.

In case of only detecting the brightness of the image signal S2 or the image signal S20 output from the image-pickup element ID, since the image signal S2 or the image signal S20 has its lightness corrected suitably by an Automatic Gain Control (AGC), it cannot be seen whether the brightness of the image signal S2 or the image signal S20 corresponds to the original outside light, or the brightness of the image signal S2 or the image signal S20 does not correspond to the original outside light and is corrected as it is assumed that there exists suitable light.

On the other hand, in the authentication device 1 in this embodiment, since the brightness of the image signal S2 or the image signal S20 is detected in case the exposure time for the image-pickup element ID comes to be a value representing an outside light illumination intensity equal to or more than a predetermined value, the image signal S2 or the image signal S20 whose brightness comes to be the brightness corresponds to the original outside light can be surely smoothed. As a result, the difference of the outside light fluctuation at the time of registration and at the time of authentication can be absorbed. Furthermore, in this case, the image signal S2 or the image signal S20 which is obtained from the image-pickup element ID to which the original outside light is not applied though, that is, an image signal which is obtained as the spoofing behavior can be excluded.

Furthermore, at the time of authentication, the authentication device 1 smoothes a region enclosed by the outline of the living organism identification subject contained in the image signal S20 output from the image-pickup element ID, and collates the feature of the living organism identification subject contained in thus smoothed region and part of the feature of the registered living organism identification subject corresponding to the region (FIG. 7).

Accordingly, in the authentication device 1, of the living organism identification subject that is to be collated with the previously registered living organism identification subject, the region whose image has not been picked up because of the outside light fluctuation due to the image-pickup environment and image-pickup condition can be excluded. As a result, the difference of the outside light fluctuation at the time of registration and at the time of authentication can be further absorbed.

According to the above-described configuration, since the living organism identification subject contained in the image signal S2 or image signal S20 can be generated as registration information or information to be collated with registration information without widely changing it according to the outside light fluctuation, it can be prevented that the living organism identification subject contained in an image signal is different even if the identical image-pickup subject is picked up, which can realize the authentication device 1 capable of improving the authentication accuracy.

(3-B) Processing Contents of Control Unit in Second Embodiment

In the control unit 10 of the authentication device 1, a processing including a processing to detect whether or not input image data is due to the spoofing behavior is employed as the processing in the second embodiment.

(3-B-1) Functional Configuration

Figure 9:
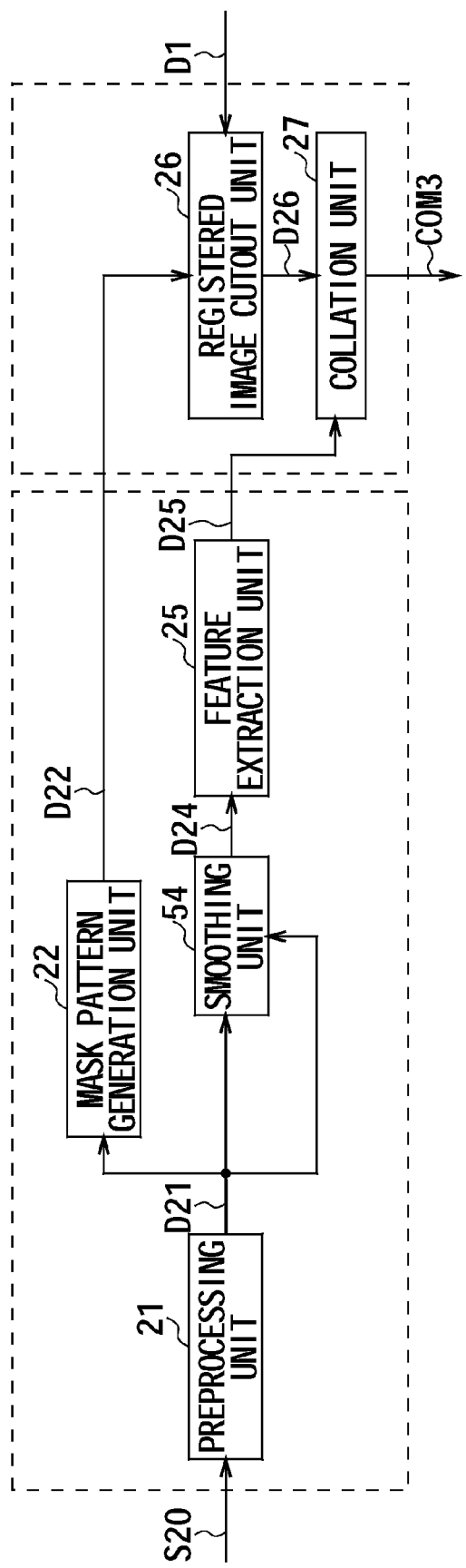
FIG. 9 shows a block diagram indicative of the functional configuration of image processing and collation processing of a control unit in the second embodiment.

FIG. 9 shows a block diagram indicative of the functional configuration of the control unit 10 in the second embodiment, which includes a preprocessing unit 21, a mask pattern generation unit 22, a smoothing unit 54, a feature extraction unit 25, a registered image cutout unit 26, and a collation unit 27, in which parts or components similar to those shown in FIG. 3 are indicated with the same reference numerals.

In the image processing of the control unit 10 in the second embodiment, of the image processings of the control unit 10 in the first embodiment, the processing unit corresponding to the lightness detection unit 23 is eliminated, and the smoothing unit 24 is replaced by the smoothing unit 54.

Figure 10:
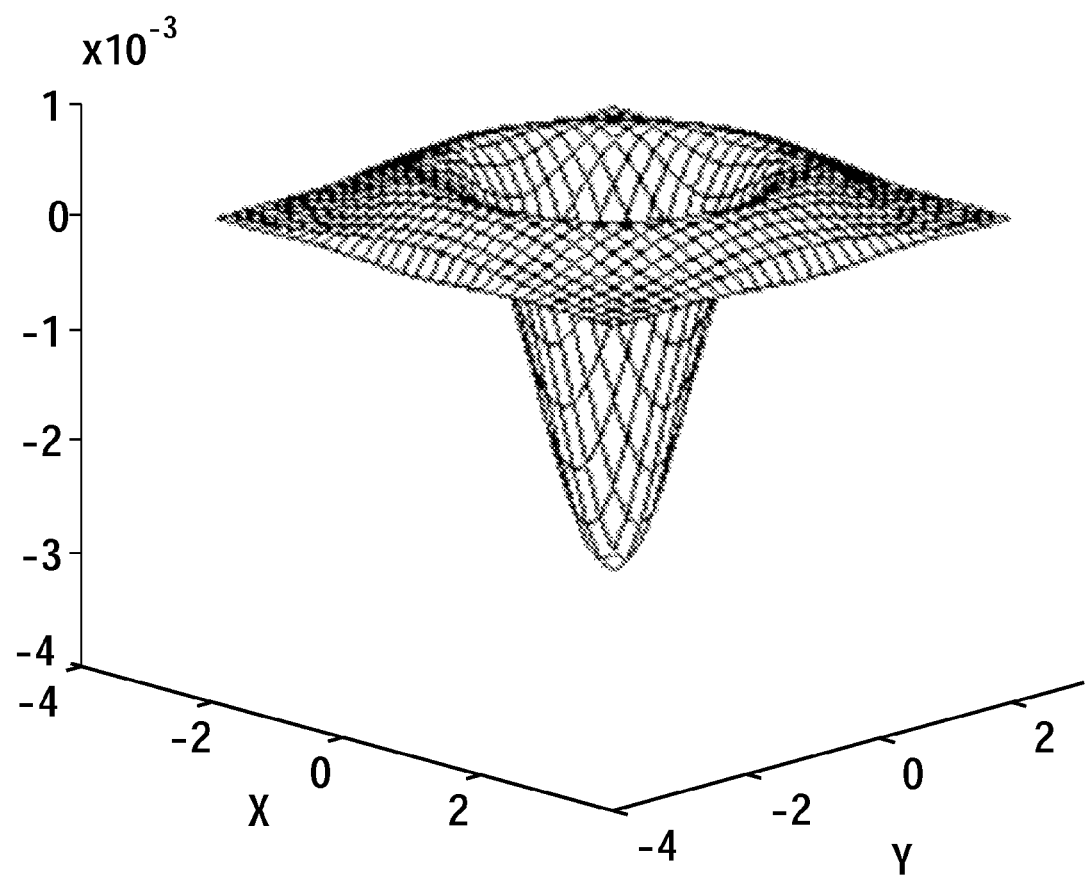
FIG. 10 shows a schematic view indicative of the figuration of a LOG filter.

The smoothing unit 54 performs a filter processing called the LOG filter for the input image (image data D21) using a first filter coefficient being the standard filter coefficient and a second filter coefficient whose degree of smoothing is large or small as compared with the standard filter coefficient. The LOG filter can be represented by the following mathematical formula on the two dimension, depicting the figuration shown in FIG. 10.

$$LoG(x, y) = -\frac{1}{\pi\sigma^4}\left[1 - \frac{x^2 + y^2}{2\sigma^2}\right]e^{-\frac{x^2+y^2}{2\sigma^2}} \quad (1)$$

Figure 11A:
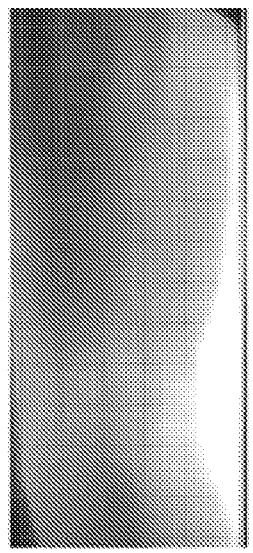
FIG. 11A to FIG. 11F show the relationship between the degree of smoothing and the amount of blood vessel pattern.
Figure 11B:
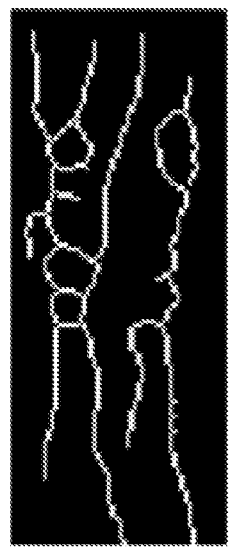
Figure 11C:
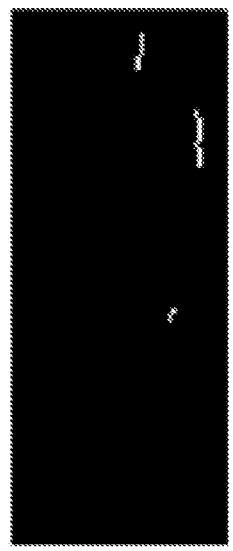
Figure 11D:
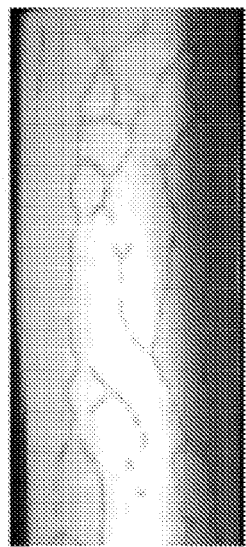

As described above, the smoothing can adjust the position of the image-pickup surface in the depth direction (internal direction) from the finger pad surface according to the degree of smoothing (filter coefficient). Accordingly, as shown in FIG. 11A to FIG. 11F, in case a finger of a living organism is the image-pickup subject (FIG. 11A), whose image is to be picked up, and the smoothing is performed for the blood vessel pattern extracted from the image-pickup result using both the first filter coefficient and second filter coefficient, as shown in FIG. 11B and FIG. 11C, the amount of the blood vessel pattern reflected on the input image is widely changed.

Figure 11E:
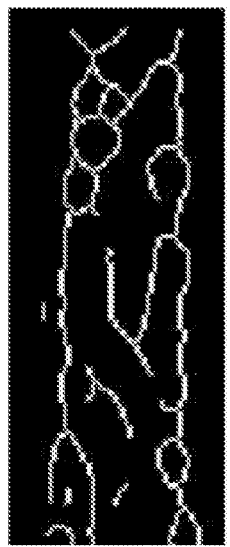
Figure 11F:
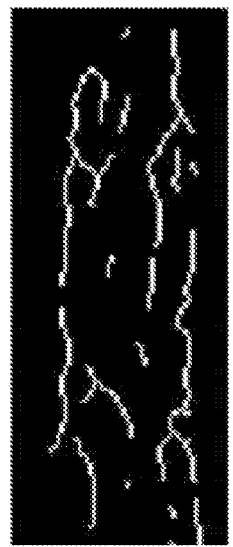

On the other hand, in case a picture of the blood vessel pattern is the image-pickup subject (FIG. 11D), and the smoothing is performed for the blood vessel pattern extracted from the image-pickup result using both the first filter coefficient and second filter coefficient, since the picture does not have the depth direction, as shown in FIG. 11E and FIG. 11F, the amount of the blood vessel pattern reflected on the input image is slightly changed as compared with the case in which a finger of a living organism is the image-pickup subject. Furthermore, the changed amount becomes substantially constant irrespective of the size of the difference between the first filter coefficient and the second filter coefficient.

Accordingly, in case the degree of similarity of the smoothing results using both the first filter coefficient and second filter coefficient is equal to or more than a predetermined threshold value, it is determined that the input image is unchangeable data such as the case in which a picture of a stolen blood vessel pattern is illegally input as the image-pickup subject, or the case in which a stolen blood vessel pattern is illegally input without picking up the image thereof, and the smoothing unit 54 breaks off the input image and suspends the subsequent processing (suspends the blood vessel registration mode or the authentication mode).

On the other hand, in case the degree of similarity is less than a predetermined threshold value, it is determined that the input image is not illegally input, and the smoothing unit 54 sends the filter processing result using the first filter coefficient being the standard filter coefficient to the feature extraction unit 25 as image data D24.

Accordingly, utilizing the characteristics of the smoothing that the input image can be corrected such that the surface of the blood vessel depth (depth from finger pad surface) comes to be the image-pickup surface, the smoothing unit 54 judges whether or not the input image is unchangeable data by correcting (smoothing) the input image using two correction values (filter coefficients) which have been prescribed in advance, and referring to the degree of similarity of the results.

With respect to the point of utilizing the characteristics of the smoothing that the input image can be corrected such that the surface of the blood vessel depth (depth from finger pad surface) comes to be the image-pickup surface, the smoothing unit 54 is similar to the smoothing unit 24.

In the point of judging whether or not the input image is unchangeable data by correcting (smoothing) the input image using two correction values (filter coefficients) which have been prescribed in advance, and referring to the degree of similarity of the results, the smoothing unit 54 is different from the smoothing unit 24 that makes the nonuniformity raised by the outside light fluctuation due to the image-pickup environment and image-pickup condition inconspicuous by correcting (smoothing) the input image using a correction value (filter coefficient) according to the brightness of the input image.

(3-B-2) Authentication Processing of Control Unit in Second Embodiment

Figure 8A:
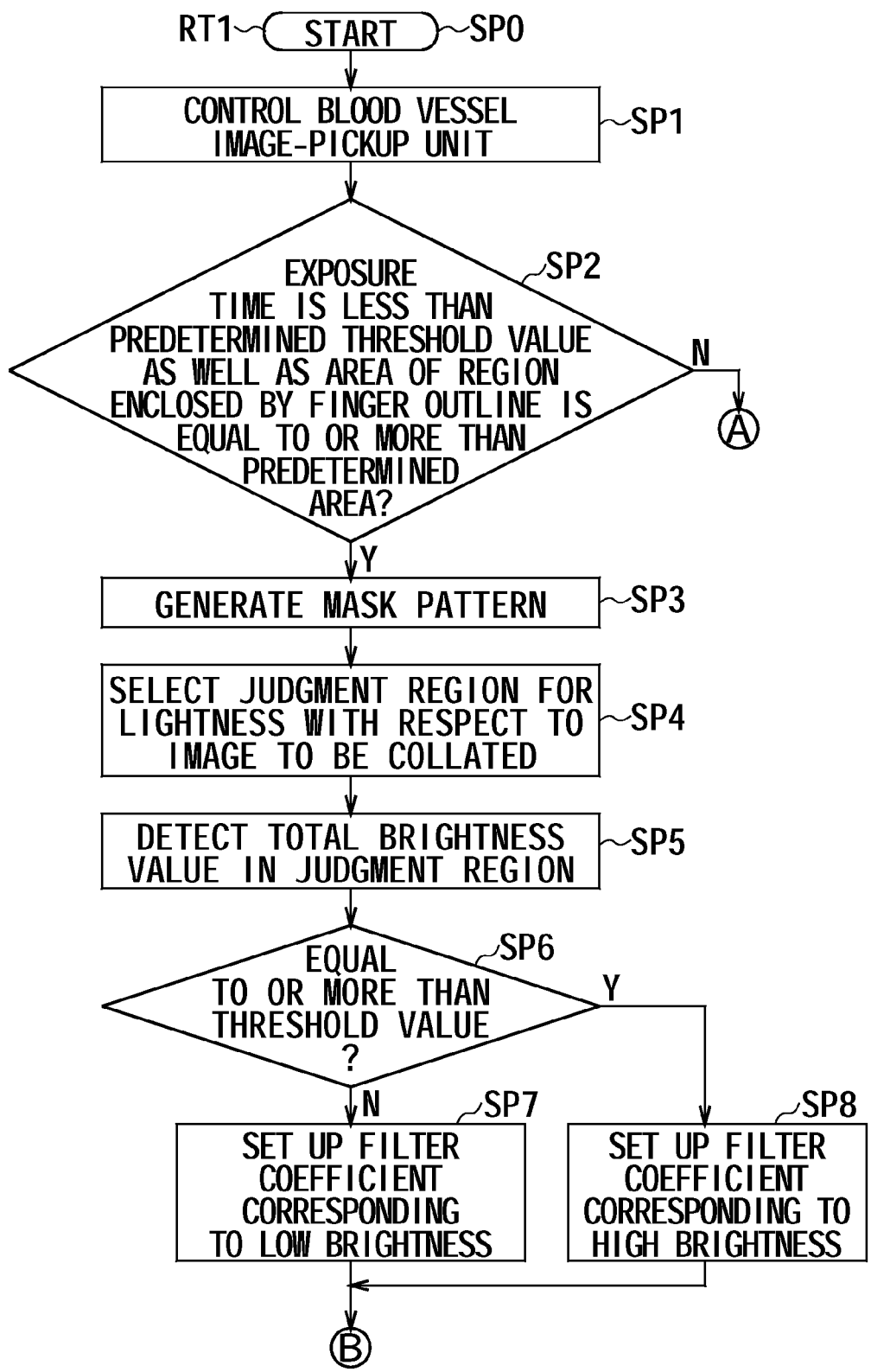
FIG. 8A and FIG. 8B show flowcharts indicative of the authentication processing sequence in the first embodiment.
Figure 8B:
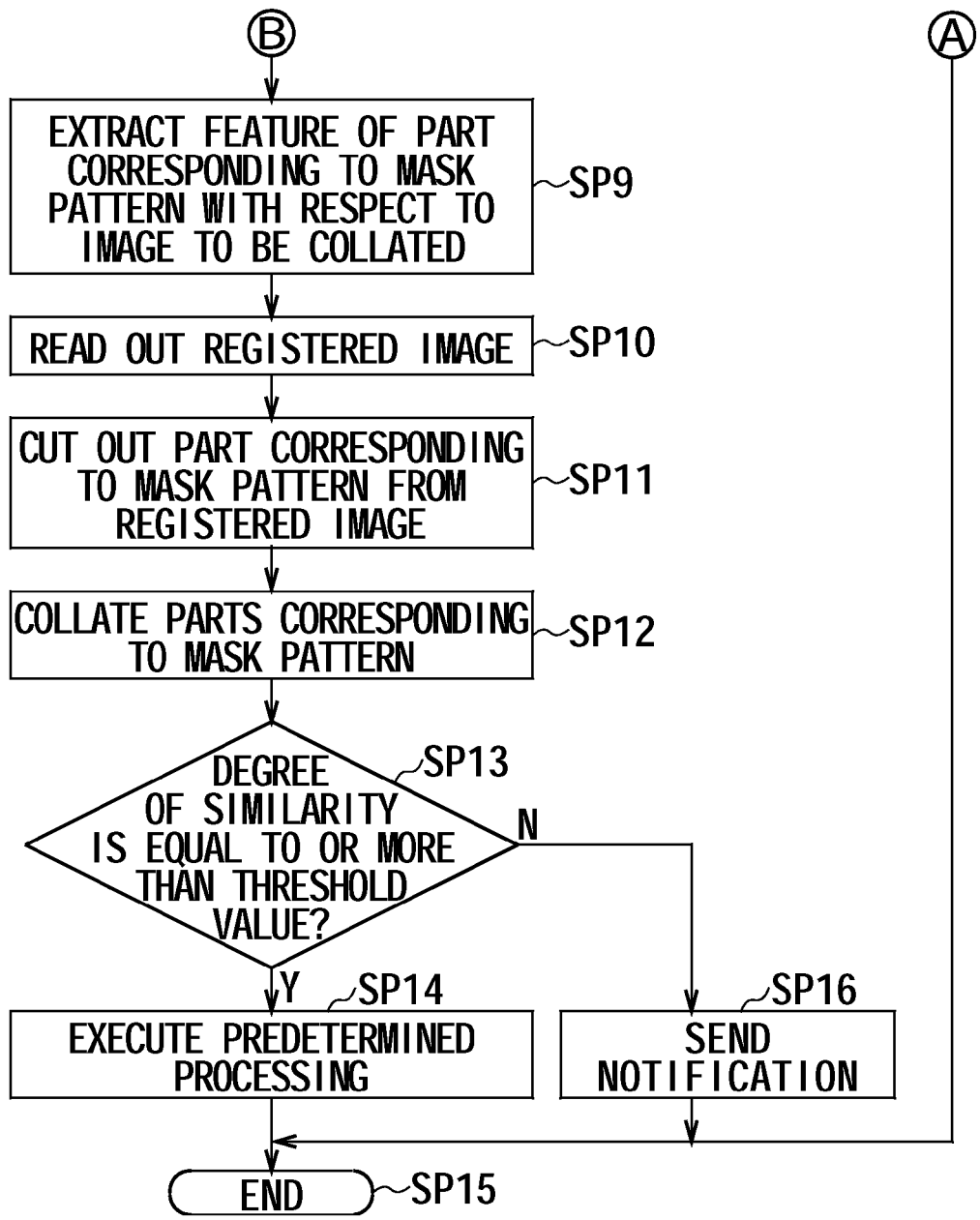
Figure 12A:
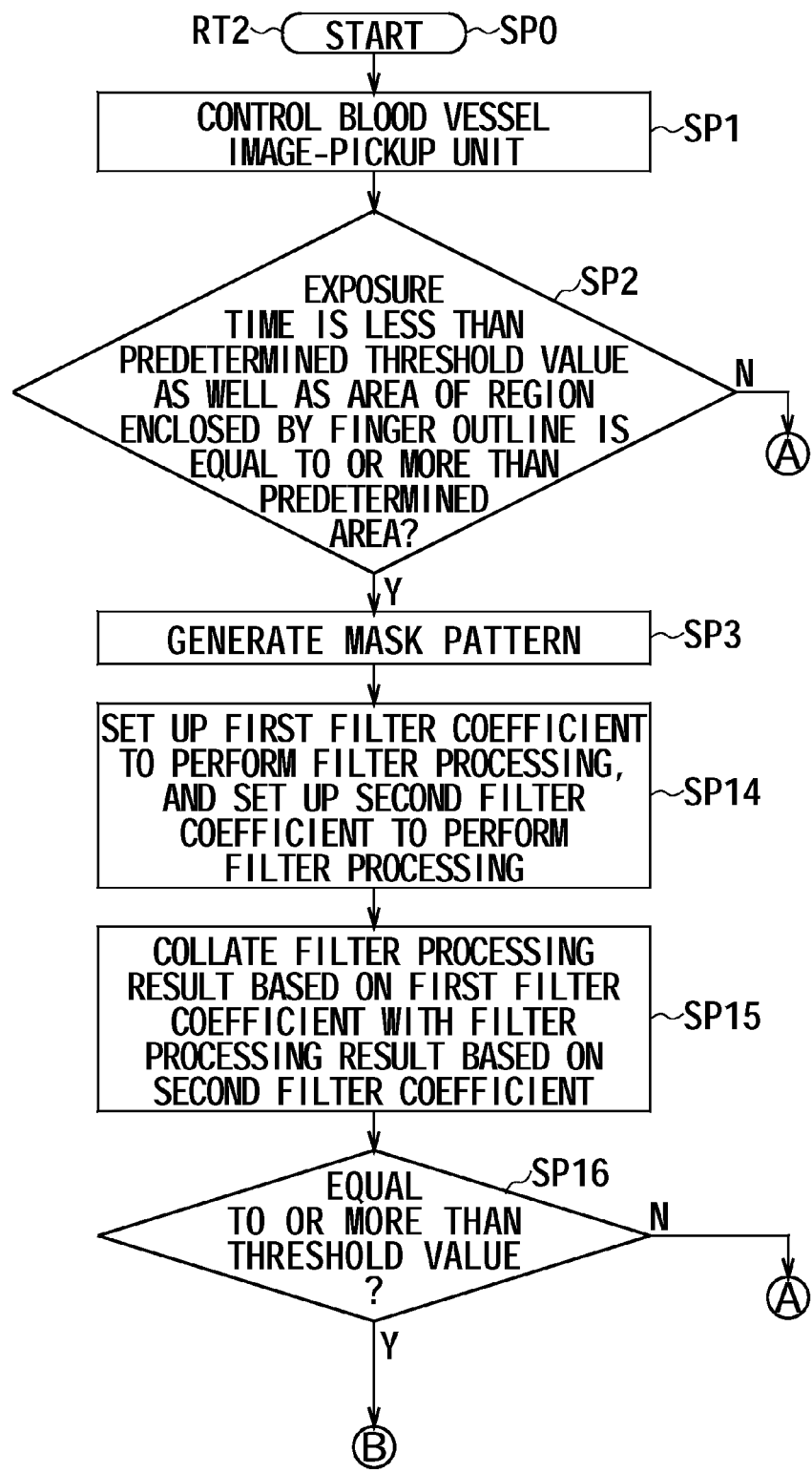
FIG. 12A and FIG. 12B show flowcharts indicative of the authentication processing in the second embodiment.
Figure 12B:
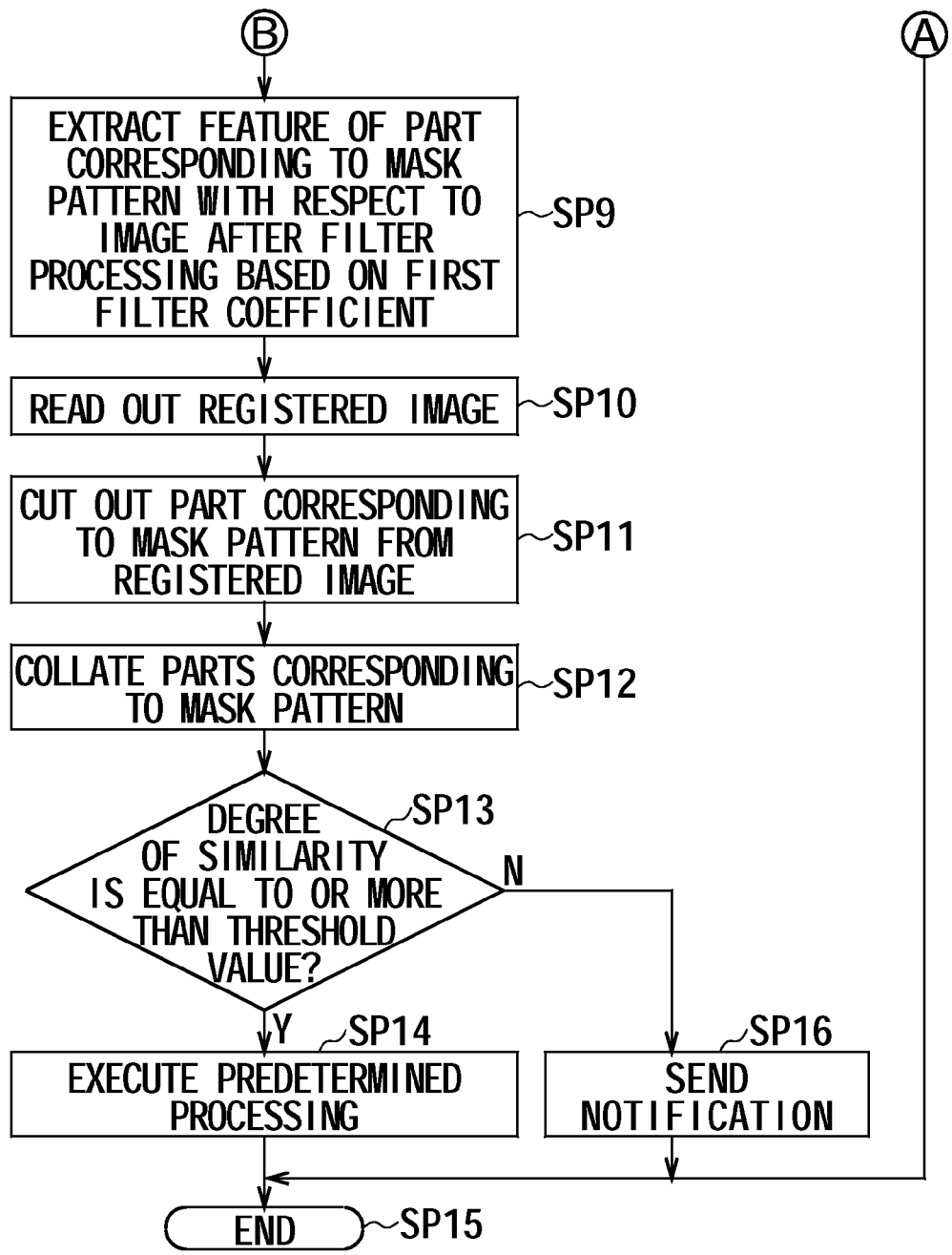

Next, the authentication processing of the control unit 10 in the second embodiment will be explained using a flowchart shown in FIG. 12, in which steps similar to those shown in FIG. 8 are indicated with the same step numbers.

When receiving the execution command COM 2, the control unit 10 starts the authentication processing sequence RT 2 in step SP 0, and, similar to step SP 1 to step SP 3 of the above-described authentication processing sequence RT 1, in case an exposure time with respect to the image-pickup element ID in the blood vessel image-pickup unit 12 is less than a predetermined threshold value as well as the area of a region enclosed by the finger outline of the image signal S20 obtained as the image-pickup result by the blood vessel image-pickup unit 12 is equal to or more than a predetermined area, the control unit 10 generates the region enclosed by the finger outline of the image signal S20 as the mask pattern (FIG. 4).

Then, the control unit 10 performs a filter processing for the input image using a first filter coefficient being the standard filter coefficient and a second filter coefficient whose degree of smoothing is large or small as compared with the standard filter coefficient in step SP 14, and, going to step SP 15, after collating both the filter processing results, judges whether or not the degree of similarity of both the filter processing results is equal to or more than a predetermined threshold value in step SP 16.

In case the degree of similarity of both the filter processing results is equal to or more than a predetermined threshold value, as described above, this means that the input image is unchangeable data such as the case in which a picture of a stolen blood vessel pattern is illegally input as the image-pickup subject, or the case in which a stolen blood vessel pattern is illegally input without picking up the image thereof. Accordingly, in this case, the control unit 10 breaks off the input image, and then ends the authentication processing sequence RT 2 in step SP 15.

On the other hand, in case the degree of similarity is less than a predetermined threshold value, similar to step SP 9 to step SP 13 of the above-described authentication processing sequence RT 1, of the previously registered blood vessels, the control unit 10 performs the collation with the input image after excluding part whose image has not been picked up due to the local difference of the outside light illumination intensity from the subject to be collated.

In case the degree of similarity, which is obtained as the collation result, is equal to or more than a threshold value, the control unit 10 makes a performance processing device, not shown, carry out a predetermined processing through the external interface 14 (FIG. 1) in step SP 14, and, going to step SP 15, ends the authentication processing sequence RT 2. On the other hand, in case the degree of similarity is less than a threshold value, the control unit 10 sends a notification that the user is not a registrant through the notification unit 15 (FIG. 1) in step SP 16, and, going to step SP 15, ends the authentication processing sequence RT 2.

In this way, in accordance with the authentication processing sequence RT 2, the control unit 10 can carry out the authentication mode.

On the other hand, in case of the blood vessel registration mode, when receiving the execution command COM 1, the control unit 10 executes respective processings from step SP 1 to step SP 9.

(3-B-3) Performance and Effect

In the above-described configuration, the authentication device 1 performs a filter processing for the input image using a first filter coefficient being the standard filter coefficient and a second filter coefficient whose degree of smoothing is large or small as compared with the standard filter coefficient, and, after collating both the filter processing results, breaks off the input image in case the degree of similarity of both the filter processing results is equal to or more than a predetermined threshold value.

Accordingly, by employing the authentication device 1, it becomes possible to detect that the input image is unchangeable data such as the case in which a picture of a stolen blood vessel pattern is illegally input as the image-pickup subject, or the case in which a stolen blood vessel pattern is illegally input without picking up the image thereof, which can prevent a certain level of spoofing behavior.

In the above-described configuration, since it becomes possible to detect that the input image is unchangeable data, a certain level of spoofing behavior can be prevented, which can realize the authentication device 1 capable of improving the authentication accuracy.

(4) Other Embodiments

In the above-described embodiment, the case in which a finger is employed as part of a living organism is explained, to which the present invention is not restricted, and a palm, a toe, an arm, an eye, etc. may be employed.

Furthermore, in the above-described embodiment, as the living organism identification subject (living organism pattern), blood vessels are employed, to which the present invention is not restricted, and a fingerprint, a lip print, a nerve, etc., may be employed. In case of employing a nerve, when a marker anomalous with respect to a nerve is injected into a body, and the image of the marker is picked up, the nerve can be set to the living organism identification subject similar to the above-described embodiment.

Furthermore, in the above-described embodiment, the drive control unit 12a as an outside light illumination intensity adjustment means in the image-pickup camera CM adjusts the light accumulation time in the image-pickup element ID as an adjustment parameter (so-called ALC) such that the signal level corresponding to a predetermined region of the image signal S2 or the image signal S20 to be output from the image-pickup element ID becomes constant, to which the present invention is not restricted, and the brightness level of the image signal S1 or the image signal S10 may be adjusted as an adjustment parameter (so-called AGC) such that the signal level becomes constant. Furthermore, in case there is arranged a diaphragm, the diaphragm value may be adjusted as an adjustment parameter. Moreover, the irradiation light amount of the near infrared ray light sources LS may be adjusted as an adjustment parameter such that the signal level becomes constant. Moreover, the above-described two or more adjustment parameters may be adjusted such that the signal level becomes constant, and adjustment parameters other than the above-described adjustment parameters may be employed.

Furthermore, in the above-described embodiment, as fluctuation information that fluctuates according to the illumination intensity in the image-pickup element ID, after adjusting the outside light illumination intensity by the drive control unit 12a, the lightness of the image signal S2 or the image signal S20 output from the image-pickup element ID is detected, to which the present invention is not restricted, and before adjusting the outside light illumination intensity, the lightness of the image signal S1 or the image signal S10 output from the image-pickup element ID may be detected.

As another configuration, an adjustment parameter that is adjusted such that the signal level corresponding to a predetermined region of the image signal S2 or the image signal S20 output from the image-pickup element ID becomes constant may be detected.

In this way, as compared with the case in which the lightness of the image signal S2 or the image signal S20 after adjusting the outside light illumination intensity or adjustment parameters are detected, a value on which the original outside light illumination intensity at the time of image-pickup is reflected can be detected. Accordingly, in the smoothing unit 24, the smoothing processing that meets the outside light illumination intensity can be executed more faithfully, which can further improve the authentication accuracy.

As a method to calculate the lightness, the case in which the total brightness value in the judgment region AR (FIG. 6) is employed is explained, to which the present invention is not restricted, and the average brightness, a maximum value, a minimum value, or an extreme value may be employed, alternatively the color difference may be added.

As the method of selecting the judgment region AR, in case of this embodiment, there is employed a method of setting up a minimum rectangle frame RF that internally encloses the finger outline, and sequentially selecting neighboring pixels in the finger outline from the intersection point IP of the diagonal lines of the rectangle frame RF up to a predetermined number, to which the present invention is not restricted, and there may be employed a method of sequentially selecting neighboring pixels in the finger outline from the intersection point of the midpoint of a direct distance which comes to be minimum in the width direction (horizontal direction) of finger and the midpoint of a direct distance which comes to be minimum in the length direction (vertical direction) of finger up to a predetermined number.

Of the image signal S2 or the image signal S20, the lightness in the judgment region AR (FIG. 6) is detected, to which the present invention is not restricted necessarily, and the lightness of the entire image signal S2 or the image signal S20 may be detected.

Furthermore, in the above-described embodiment, as a filter means that performs the spatial filter processing for an image signal output from an image-pickup element using a filter coefficient which is made to correspond to fluctuation information, and extracts the living organism identification subject contained in the image signal, a filter processing (smoothing unit 24) that performs the Gaussian filter processing is employed, to which the present invention is not restricted, and other various filter processings such as Savitzky-Golay filter processing and LOG filter processing may be employed.

In the above-described embodiment, in the smoothing unit 24, in case the lightness is more than a threshold value, a filter coefficient of a value corresponding to high brightness is used, while in case the lightness is equal to or less than a threshold value, a filter coefficient of a value corresponding to low brightness is used, to which the present invention is not restricted, and a filter coefficient may be set up stepwise according to the detected lightness from among a plurality of filter coefficients corresponding to the lightness, and the smoothing processing may be performed using thus set up filter coefficient.

As the specific method of setting up a filter coefficient, there is employed a method of retaining the correspondence between the lightness and filter coefficient as a table in advance, and, based on the table, setting up a filter coefficient that is made to correspond to the detected lightness. Furthermore, as another setup method, for example, there is employed a method of formulating the correspondence relationship between the lightness and filter coefficient, and, based on the relational expression, setting up a filter coefficient that is made to correspond to the detected lightness. The setup method is not restricted to those methods, and other various setup methods may be employed.

Furthermore, the processing contents of the smoothing unit 24 and the processing contents of the smoothing unit 54 may be combined. Specifically, between step SP 2 and step SP 3 of the authentication processing sequence RT 1 shown in FIG. 8, step SP 14 and step SP 16 of the authentication processing sequence RT 2 shown in FIG. 12 are added. When employing this manner, not only the certain level of spoofing behavior can be prevented, but also registration information or information to be collated with registration information can be generated without widely changing it according to the outside light fluctuation, which can improve the authentication accuracy as compared with the case in which the processing contents are not combined in this way.

Furthermore, in the above-described embodiment, the binarization processing and skeletonization processing are performed for an image signal that has undergone the spatial filter processing, that is, spatially filtered by a filter means, to which the present invention is not restricted, and part or all of the processing may be omitted or replaced, or new processing with respect to the processing, that is, processing of extracting a feature point in the living organism identification subject (living organism pattern) extracted by the filter means may be added. Furthermore, the order of processing may be arbitrarily changed.

Furthermore, in the above-described embodiment, the authentication device 1 that is provided with the image-pickup function, collation function, and registration function is employed, to which the present invention is not restricted, and various configurations may be employed according to the intended use such as the configuration in which single devices are employed for the respective functions.

The present invention can be utilized in the field of the biometrics authentication.

It should be understood by those skilled in the art that various modifications, combinations sub-combinations and alterations may occur depending on design requirements and other factors insofar as they are within the scope of the appended claims or the equivalents thereof.

What is claimed is:

1. A registration device, comprising:
a detection unit configured to detect fluctuation information that fluctuates according to an outside light illumination intensity in an image-pickup element;
a filter unit configured to perform a spatial filter processing for an image signal output from the image-pickup element using a filter coefficient that corresponds to the fluctuation information of the outside light illumination intensity detected by the detection unit and to extract a living organism identification subject contained in the image signal; and
a registration unit configured to generate registration data from the image signal that is spatially filtered by the filter unit and to store thus generated registration data in a storage medium,
wherein,
the fluctuation information is a parameter that is determined by an adjustment processing where the illumination intensity is adjusted such that the lightness of the image signal output from the image-pickup element becomes constant.

2. The registration device according to claim 1, wherein:
the filter unit includes an outline extraction unit configured to extract the outline of the living organism identification subject contained in the image signal output from the image-pickup element, and
the filter unit performs the spatial filter processing for a region enclosed by the extracted outline.

3. The registration device according to claim 2, wherein:
the registration unit generates registration data from the image signal that is spatially filtered by the filter unit when the area of the region is equal to or more than a predetermined threshold value, and
the registration unit separates the image signal that is spatially filtered by the filter unit when the area of the region is less than a predetermined threshold value.

4. The registration device according to claim 2, wherein the detection unit detects the lightness of the region enclosed by the outline.

5. The registration device according to claim 4, wherein the detection unit detects the lightness of the central part of the region enclosed by the outline.

6. The registration device according to claim 1, wherein:
the detection unit includes a first adjustment unit configured to adjust the parameter of the image-pickup element such that the lightness of the image signal output from the image-pickup element is constant, and
a second detection unit configured to detect the lightness of the image signal output from the image-pickup element when the value of the parameter is equal to or more than a predetermined value.

7. A collation device, comprising:
a detection unit configured to detect fluctuation information that fluctuates according to an outside light illumination intensity in an image-pickup element;
a filter unit configured to perform a spatial filter processing for an image signal output from the image-pickup element using a filter coefficient that corresponds to the fluctuation information of the outside light illumination intensity detected by the detection unit and to extract a living organism identification subject contained in the image signal; and
a collation unit configured to collate the image signal that is spatially filtered by the filter unit with registered data, wherein,
the fluctuation information is a parameter that is determined by an adjustment processing where the illumination intensity is adjusted such that the lightness of the image signal output from the image-pickup element becomes constant.

8. The collation device according to claim 7, wherein:
the filter unit includes outline extraction unit for extracting the outline of the living organism identification subject contained in the image signal output from the image-pickup element, and
the filter unit performs the spatial filter processing for a region enclosed by the extracted outline.

9. The collation device according to claim 8, wherein:
the collation unit collates the image signal that is spatially filtered by the filter unit with registered data when the area of the region is equal to or more than a predetermined threshold value, and
the collation unit separates the portion of image signal that is spatially filtered by the filter unit from the image signal when the area of the region is less than a predetermined threshold value.

10. The collation device according to claim 8, wherein the detection unit detects the lightness of the region enclosed by the outline.

11. The collation device according to claim 10, wherein the detection unit detects the lightness of the central part of the region enclosed by the outline.

12. The collation device according to claim 7, wherein:
the detection unit includes first adjustment unit configured to adjust the parameter of the image-pickup element such that the level of the image signal output from the image-pickup element becomes constant, and
a second detection unit configured to detect the lightness of the image signal output from the image-pickup element when the value of the parameter is equal to or more than a predetermined value.

13. An extraction method, comprising:
a first step of detecting fluctuation information that fluctuates according to an outside light illumination intensity in an image-pickup element;
a second step of performing a spatial filter processing for an image signal output from the image-pickup element using a filter coefficient that corresponds to the fluctuation information of the outside light illumination intensity detected in the first step, and extracting a living organism identification subject contained in the image signal; and
a third step of generating registration data or data to be collated with the registration data from the image signal that is spatially filtered,
wherein,
the fluctuation information is a parameter that is determined by an adjustment processing where the illumination intensity is adjusted such that the lightness of the image signal output from the image-pickup element becomes constant.

14. A non-transitory computer-readable medium containing instructions that cause a program to perform the steps of:
detecting fluctuation information that fluctuates according to an outside light illumination intensity in an image-pickup element;
performing a spatial filter processing for an image signal output from the image-pickup element using a filter coefficient that corresponds to the detected fluctuation information of the outside light illumination intensity, and extracting a living organism identification subject contained in the image signal; and
generating registration data or data to be collated with the registration data from the image signal that is spatially filtered,
wherein,
the fluctuation information is a parameter that is determined by an adjustment processing where the illumination intensity is adjusted such that the lightness of the image signal output from the image-pickup element becomes constant.

* * * * *